Aug. 16, 1960     A. C. DE WILDE     2,949,237
MODULATING VALVE CONTROL SYSTEM
Filed May 29, 1957

INVENTOR.
Andries C. deWilde
BY
D. C. Staley
His Attorney

United States Patent Office 2,949,237
Patented Aug. 16, 1960

2,949,237

MODULATING VALVE CONTROL SYSTEM

Andries C. de Wilde, Warren, Mich., assignor to General Motors Corporation, Detroit, Mich., a corporation of Delaware Filed May 29, 1957, Ser. No. 662,468

11 Claims. (Cl. 236—78)

This invention pertains to control systems utilizing magnetic amplifiers and particularly to an improved magnetic amplifier system for a modulating type automatic temperature control.

In a modulating type of gas furnace, the gas flow is controlled in such a manner that the heat supply balances the heat losses. Thus, a fairly constant temperature will be achieved and even comfort throughout the space heated by the gas furnace. It is desirable to enable the occupants of the space to select and manually preset the temperature level they desire and have the control automatically maintain that temperature level within certain limits. Such a control can be made in various ways, the invention showing an electronic control utilizing an improved magnetic amplifier that will encompass several additional features. The control incorporates means for automatically compensating for changes in the demand of heat and, thus, maintaining an essentially almost constant temperature and even comfort. The control also incorporates means for automatically and completely closing the gas valve whenever the demand for heat becomes less than a predetermined minimum gas flow permissible for proper performance of the heating furnace. Moreover, the control incorporates an automatic resumption of normal modulating operation whenever the space temperature begins to fall below a predetermined setting. In addition, the control incorporates a means for automatically compensating for variations in the supply line voltage, so as to minimize adverse effects thereof on the functioning of the modulating operation of the control. Accordingly, among our objects are the provision of a modulating valve control system including a magnetic amplifier; the further provision of an improved magnetic amplifier control system; and the further provision of a modulating valve control system having a magnetic amplifier including means for effectively cutting off the output of the magnetic amplifier when the output thereof falls below a predetermined value; and the still further provision of a modulating valve control system having a magnetic amplifier including means for compensating for variations in the supply line voltage.

The aforementioned and other objects are accomplished in the present invention by obtaining a voltage proportional to the output current of a magnetic amplifier, and utilizing this proportional voltage to control the cutoff point of the magnetic amplifier. Specifically, the magnetic amplifier comprises a saturable magnetic core, carrying variable reactance load windings oppositely wound, and carrying three control windings, namely a thermostat control winding a bias control winding and a cutoff control winding. To illustrate such a magnetic amplifier a three-legged core is shown in the drawings. The load windings are connected to a full wave rectifier having a load resistor across which a voltage proportional to the output current of the magnetic amplifier is developed. The load windings are connected in series with an A.C. positioning solenoid that controls a gas valve the current supply for the load windings is obtained from an alternating current supply the voltage of which may be subjected to variations.

The thermostat control winding is connected to a thermostat bridge comprising four legs arranged in a balanced bridge circuit with a calibrating potentiometer between two legs. Two of the opposed legs include fixed resistors and the other two opposed legs include thermistors having negative temperature coefficients. The thermostat bridge is energized from a constant voltage D.C. source and the bridge output energizes the thermostat control winding of the magnetic amplifier. Thus, when the space temperature to which the thermostat bridge is subjected is below the control setting thereof, the bridge is unbalanced in one direction, and hence current flows between the junctions of the legs through the thermostat control winding of the magnetic amplifier.

When space temperature is below the setting of the thermostat bridge, the current induced by the unbalance of the bridge flowing through the thermostat control windings of the magnetic amplifier produces a flux which tends to saturate the core, thus reducing the impedance of the magnetic amplifier and thus increasing the average load current in the output circuit of the magnetic amplifier and keep the solenoid valve fully open. When the space temperature equals the temperature setting of the thermostat bridge the bridge will be balanced and have no output current. However, the output signal of the bridge reverses in polarity as the space temperature exceeds the temperature setting of the thermostat bridge, so that the current flow through the thermostat control winding develops a flux which reduces the flux produced by the load windings and thus reduces the average output current of the magnetic amplifier so as to modulate gas flow in accordance with space temperature.

In one embodiment, the bias control winding is connected across the load resistor in the output rectifier of the magnetic amplifier. Thus, the current in the bias control winding is proportional to the average load output current of the magnetic amplifier, and the flux produced by the bias winding opposes the flux produced by the load windings.

The cutoff control winding is connected between the magnetic amplifier load resistor and a fixed reference voltage from the constant voltage D.C. supply through a switching diode. As long as the D.C. voltage across the magnetic amplifier load resistor exceeds the fixed reference voltage, the cutoff winding is deenergized. However, as the average load current in the output of the magnetic amplifier is reduced by operation of the thermostat bridge, a point will be reached when the voltage across the magnetic amplifier load resistor is less than the fixed reference voltage. When this occurs, the switching diode conducts and energizes the cutoff winding which produces a flux that desaturates the core of the magnetic amplifier. When the core of the magnetic amplifier is desaturated by the cutoff control winding, the average load current in the output circuit of the magnetic amplifier is reduced to a value insufficient to maintain the gas valve open so that the gas valve is closed by its spring. The gas valve will remain closed until the space temperature falls below the control setting of the thermostat bridge, at which time the flux produced by the thermostat control winding will tend to saturate the core so that the average load current in the output circuit of the magnetic amplifier will be increased to a maximum thereby deenergizing the cutoff winding and fully opening the gas valve.

In the second embodiment, the bias control winding is connected across the load resistor in the output rectifier of the magnetic amplifier, and in addition, connected across a resistor in the D.C. source for energizing the thermostat bridge. The resistor in the D.C. source across which the bias control winding is connected has a voltage thereacross which varies with variations in the alternating current supply voltage. Moreover, the voltages across the magnetic amplifier load resistor and the resistor in the D.C. source act in additive relation to each other so that the flux produced by the current flow through the bias control winding will automatically compensate for variations in supply line voltage. Thus, if the supply voltage increases, the bias control winding current will increase, and if the supply voltage decreases, the bias control winding current will decrease so that the output current of the magnetic amplifier will not vary appreciably with variations in the supply line voltage.

Further objects and advantages of the present invention will be apparent from the following description, reference being had to the accompanying drawings wherein similar numerals depict similar parts throughout the several views.

Figure 1:
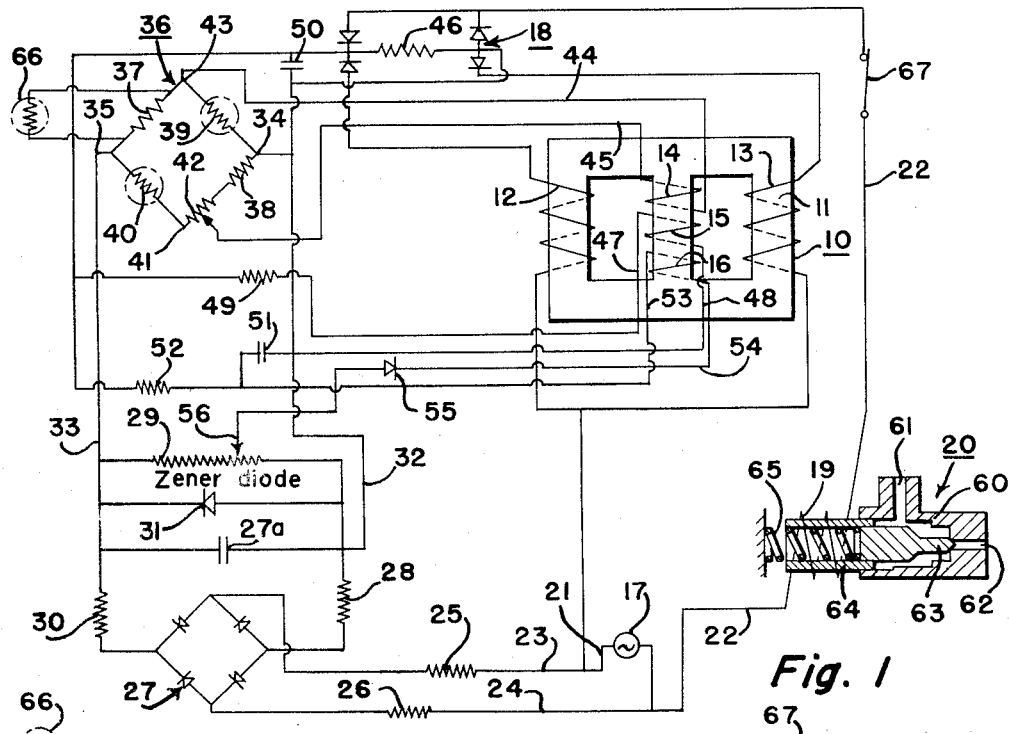
Figure 1 is an electrical circuit diagram of a modulating valve control system embodying a magnetic amplifier, and schematically depicting a solenoid operated modulating gas valve.

With particular reference to Figure 1, the control system includes a magnetic amplifier 10 of the saturable core type, which in the form shown has a closed three-legged magnetic core 11. Load windings 12 and 13 are located on the outer legs of the core 11, and control windings 14, 15 and 16 are located on the center leg. The load windings 12 and 13 are shown connected to a source of alternating current 17 through a full wave rectifier 18 of the dry contact type and a solenoid winding 19 of a modulating gas valve depicted generally by the numeral 20. The alternating current source 17 supplies current to conductors 22 and 21. The load windings 12 and 13 are arranged in the core 11 so that the unidirectional components of magnetic flux produced by current flow through the windings have the same direction in the outer legs and have the same mutually additive direction in the center leg of the core 11.

Conductors 21 and 22 are connected with conductors 23 and 24, respectively, which are connected to current limiting resistors 25 and 26. The conductors 23 and 24 are connected to opposed terminals of full wave bridge type rectifier indicated by numeral 27, the output of which is connected to a voltage divider network including resistor 28, potentiometer 29 and resistor 30. The voltage divider network connected with rectifier 27 includes a capacitor 27a for filtering out the ripple voltage of the rectifier 27. In addition, the potentiometer 29 is shunted by a Zener diode 31, the function of which is to maintain a substantially constant voltage across the potentiometer 29. The characteristics of Zener diodes are well known, and suffice it to say that the Zener diode has a backward firing voltage which remains substantially constant, and thus constitutes a voltage regulator. The voltage across potentiometer 29 is supplied to conductors 32 and 33 which are connected to terminals 34 and 35 of a thermostat bridge 36.

The thermostat bridge includes fixed resistors 37 and 38 in opposed legs thereof and thermistors 39 and 40 having negative temperature coefficients in the other two opposed legs thereof. The legs containing resistor 38 and thermistor 40 are connected by a potentiometer 41 which is used to balance the thermostat bridge at the desired temperature, and in addition can be adjusted to compensate for deviation in the actual ohmic values of the resistors and thermistors in the bridge circuit. The movable contact 42 of the potentiometer 41 constitutes one output terminal of the bridge 36 and the point 43 constitutes the other output terminal of the thermostat bridge. To compensate for changes in the outdoor ambient air temperature, which changes will affect the heat losses at a later time, it suffices to add a thermistor 66 shunted to resistor 37 or to resistor 38, or one thermistor shunted to 37 and another to resistor 38. These thermistors are subjected to the outdoor ambient air temperature and, by proper dimensioning, will act as anticipators for the control to compensate for changes in said outdoor ambient air temperature and do so with any desired lag in time. When the space temperature to which the bridge is subjected equals the temperature setting thereof, the ohmic values of the resistors, thermistors and portions of the potentiometer 41, in each leg are substantially equal. Thus, the bridge is balanced and there will be no potential difference between terminals 42 and 43. However when the space temperature is below the temperature setting of the bridge, the resistance of the leg including thermistor 40 and the portion of the potentiometer 41 will be greater than the resistance of the leg containing resistor 37 so that point 43 will have a positive potential with respect to point 42, whereby current will flow from terminal 43 to terminal 42. Terminals 43 and 42 are connected by conductors 44 and 45 to the control winding 14, which will hereinafter be referred to as the thermostat control winding of the magnetic amplifier. Current flow from terminal 43 to terminal 42 through the thermostat control winding 14 will produce a flux that adds to the flux produced by the load windings 12 and 13.

Conversely, when the space temperature to which the bridge 36 is subjected is greater than the temperature setting of the bridge, the resistance of the leg including the thermistor 40 and the portion of potentiometer 41 will be less than the resistance of the leg including resistor 37. Accordingly, the terminal 42 will be at a higher potential than the terminal 43, and current will flow through the thermostat control winding 14 in the opposite direction. This current flow will produce a flux which opposes the flux produced by the load windings 12 and 13.

The full wave rectifier 18 which is connected with the load windings 12 and 13 of the magnetic amplifier has a load resistor 46 connected across its terminals. The D.C. voltage across the resistor 46 is directly proportional to the output current of the magnetic amplifier which flows through load windings 12 and 13. Thus, the voltage across resistor 46 is high when the output current of the magnetic amplifier is high, and is low when the output current of the magnetic amplifier is low. Control winding 15, which will hereinafter be referred to as the bias control winding, is connected across the resistor 46 by conductors 47 and 48. Conductor 47 has a current limiting resistor 49 therein. Capacitors 50 and 51 in combination with resistor 52 constitute a filter for reducing the ripple in the voltage developed across resistor 46. The current flow through the bias control winding 15 produces a flux which opposes the flux produced by the load windings 12 and 13.

The control winding 16, which will hereinafter be referred to as the cutoff control winding, is connected to conductors 53 and 54. Conductor 53 is connected to the positive side of the load resistor 46 through resistor 52. Conductor 54 is connected through switching diode 55, of the dry contact type, to the movable contact 56 of the potentiometer 29. The movable contact 56 of the potentiometer 29 is adjusted so that the fixed reference voltage at this point has a predetermined relation to the voltage developed across resistor 46 with a minimum output of the magnetic amplifier consistent with the minimum open position of the solenoid valve 20. When the potential at the positive side of resistor 46 exceeds the potential at the movable contact 56 of the potentiometer 29, the diode 55 will be cut off and thus no current will flow through the cutoff control winding 16. However, as soon as the voltage at the movable contact 56 exceeds the voltage across resistor 46, the diode 55 will conduct, and current flow through the cutoff winding 16 will produce a flux which opposes the flux produced by the load windings 12 and 13. This opposing flux will further reduce the current in load windings 12 and 13 to desaturate the core 11 and hence further reduce the voltage across resistor 46 so that the output current of the magnetic amplifier will quickly be reduced to a low value at which time the solenoid valve 20 will be closed by its spring.

The valve 20 is shown schematically in Figure 1 as including a housing 60 having a gas inlet opening 61 and a gas outlet opening 62. A reciprocable plunger 63 is disposed within the housing 60, the plunger having a conical end arranged to completely close, completely open or throttle the flow of gas through the outlet port 62. The position of the plunger 63, which carries a sleeve 64 of magnetic material, is determined by the opposing forces of a spring 65, which tends to move the plunger to a closed position, and the magnetic field produced by coil 19 which tends to move the plunger 63 in the opposite direction. The valve structure, per se, constitutes no part of this invention and suffice it to say that the plunger 63 assumes a position in proportion to the current in the output circuit of the magnetic amplifier. When the current through the solenoid winding 19 is reduced to a predetermined low value, the spring 65 will move the plunger 63 so as to completely close the outlet port 62. To complete the scheme, a bonnet temperature limit control sensitive to that temperature is shown schematically in Figure 1, as 67. This switch will cutoff the current and, thus, close the valve whenever the bonnet temperature exceeds a predetermined value. When the temperature reduces below its setting, the bonnet limit control will snap in and close the circuit which then allows the control to resume its operation. The bonnet temperature limit control does not constitute part of this invention.

Operation of the control system disclosed in Figure 1 is as follows: When the space temperature is below the control setting of the thermostat bridge 36, the flux produced by the thermostat control winding 14 assists in saturating the core 11 so that the magnetic winding has a maximum output current. At this time the cutoff control winding 16 is de-energized and the bias winding 15 is energized in proportion to the output current of the magnetic amplifier. Since the flux in the bias control winding 15 opposes the flux produced in the load windings 12 and 13, the bias winding will partially compensate for variations in line voltage at the alternating current source 17. When the ambient temperature is below the control setting of the thermostat bridge 36, the output current of the magnetic amplifier flowing through solenoid winding 19 is sufficient to maintain the plunger 63 in a position where the outlet port 62 is fully open. The signal polarity of the thermostat bridge 36 reverses when the space temperature exceeds the control setting thereof so that the thermostat control winding 14 produces a flux which opposes the flux produced by the lead windings 12 and 13. In this manner the output current of the magnetic amplifier will be proportionately reduced in accordance with the amplitude of the signal from the thermostat bridge 36 so as to modulate the glas flow through the valve 20 due to a decrease in the magnetic force of coil 19 permitting spring 65 to move the plunger 63 towards the closed position.

At a predetermined point in the modulating range, which is determined by the combustion characteristics of the furnace, the voltage developed across the load resistor 46 will become less than the fixed reference voltage taken off by movable contact 56 of potentiometer 29, whereupon the switching diode 55 will conduct, and the cutoff control winding will produce a flux that quickly desaturates the core 11. When the core 11 is desaturated the output of the magnetic amplifier will be reduced to a minimum permitting the spring 19 to move the plunger 63 to the closed position and hold it closed. As the space temperature becomes less than the control setting of the thermostat bridge 36, a point will be reached where the flux produced by the thermostat control winding 14 tending to saturate the core 11 will predominate over the desaturating effect of the flux produced by cutoff winding 16, and at this point the voltage developed across resistor 46 will exceed the fixed reference voltage taken from the potentiometer 29 by movable contact 56 so that the cutoff control winding will be deenergized. When the cutoff control winding is deenergized and the thermostat control winding produces a flux tending to saturate the core 11, the output of the magnetic amplifier will be quickly increased to a maximum so as to fully open the valve 20.

One of the important features of the control system concerns the voltage supply for the bias control winding 15. Since the bias control winding 15 produces a flux which tends to desaturate the core 11, thereby increasing the impedance in the load winding circuit, in the present invention the voltage supply for the bias control winding is derived from the load resistor 46 in the rectifier circuit 18 in the output of the magnetic amplifier. The voltage developed across the resistor 46 is proportional to the output current of the magnetic amplifier, and by utilizing this voltage source to energize the bias control winding 15 the operating limits of the solenoid valve are confined to a narrow range. This arrangement increases the control which can be effected by the signal from the thermostat bridge 36, and in addition tends to partially compensate for variations in line voltage. This compensation for variations in line voltage is achieved by virtue of the fact that variations in line voltage impressed upon the load windings 12 and 13 will be impressed proportionately on the bias control winding 15 due to variations in the voltage developed across the resistor 46. Thus, as line voltage increases, the output of the magnetic amplifier tends to increase thereby increasing the voltage developed across resistor 46 which causes an increase in the current in the bias control winding 15 to produce a desaturating effect on the core 11 thereby increasing the impedance of the load winding to reduce the output of the magnetic amplifier, so that the output of the magnetic amplifier will be less sensitive to variations in voltage. Conversely, upon a decrease in line voltage, the desaturating effect of the bias winding will be reduced to compensate for the decrease in line voltage.

Figure 2:
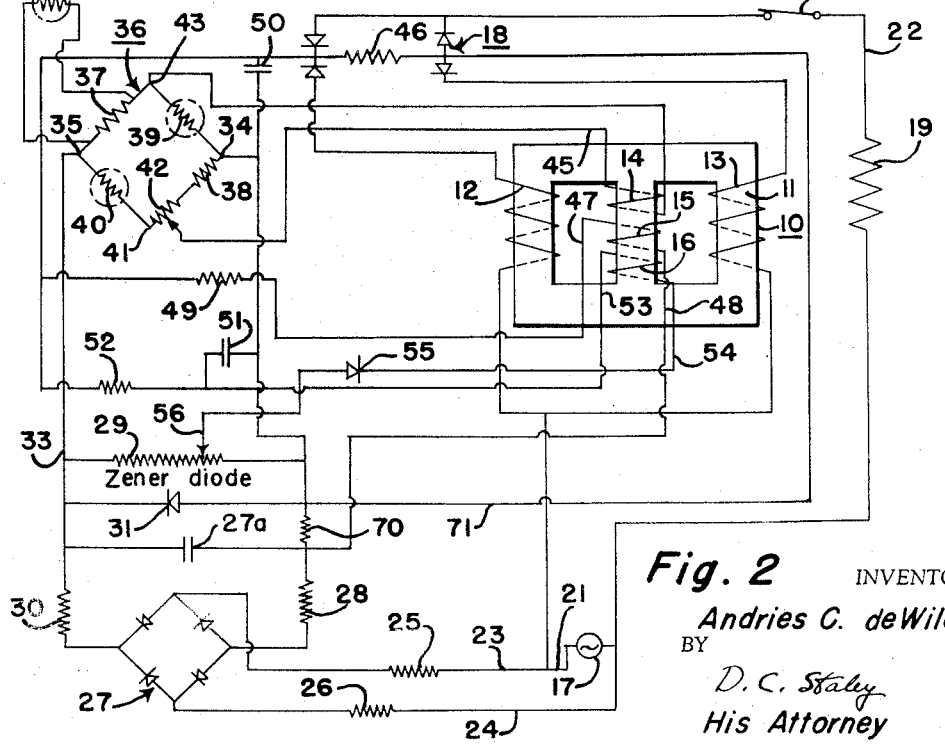
Figure 2 is a modified electrical circuit diagram similar to Figure 1 but embodying means for increasing the compensation for variations in supply line voltage.

With particular reference to Figure 2, a control system wherein additional means are incorporated for compensating for line voltage variations will be described. In Figure 2, the load windings 12 and 13 of the magnetic amplifier are connected in a circuit identical to that of Figure 1. However, the D.C. voltage supply for the thermostat bridge 36 is modified to the extent of connecting an additional resistor 70 between resistor 28 and potentiometer 29 in the voltage divider network. The resistor 70 has a voltage developed thereacross proportional to supply voltage, and is connected after the filtering capacitor 30. The lower end of resistor 70 is connected to conductor 48 which is connected with one end of the bias control winding 15. The upper end of the resistor 70 is connected with a conductor 71 which is connected to the negative terminal of the rectifier 18. Conductor 71 is also connected to conductor 32. Thus, it is seen that the bias control winding 15 is energized by a voltage proportional to line voltage as well as a voltage proportional to the output current of the magnetic amplifier. Therefore, as the supply voltage is increased, the voltage developed across resistor 70 will increase so that the current flow through the bias control winding 15 will increase to compensate for the increase in supply voltage. Conversely, if the supply voltage decreases, the voltage-across resistor 70 will decrease and the current flow through the bias control winding 15 will decrease. The modified energizing circuit for the bias control winding 15 provides a more adequate compensation for variations in supply line voltage. However, the desirable control effect of the bias winding 15 in responding to the output current of the magnetic amplifier is still retained since irrespective of variations in supply line voltage, the bias winding will determine the operating limits of the solenoid valve. The current limiting resistor 49 must, of course, be adjusted to obtain the proper bias current flow in the second embodiment.

Operation of the second embodiment is the same as the first embodiment, in that when the space temperature is below the control setting of the thermostat bridge 36, the valve 20 will be fully open, and as the space temperature exceeds the control setting of the thermostat bridge, the gas flow will be modulated until the cutoff period is reached.

While the embodiments of the invention as herein disclosed constitute preferred forms, it is to be understood that other forms might be adopted, as may come within the scope of the claims which follow.

What is claimed is as follows:

1. In a control system having an output circuit and three input control circuits for controlling the signal obtained from the output circuit; a fluid control valve, a solenoid winding for operating said valve, said solenoid winding being connected in said output circuit, temperature responsive means producing a signal proportional to temperature for energizing one of said input control circuits, said signal having one polarity when the controlled temperature is higher than the setting of the temperature responsive means and an opposite polarity when the controlled temperature is lower than the setting of the temperature responsive means, means for energizing a second of said input control circuits in proportion to the magnitude of the signal in the output circuit, and means energizing the third input control circuit when the magnitude of the signal in the output circuit is less than a predetermined value for reducing the signal in the output circuit to a minimum and permit closure of said valve.

2. A control system including in combination, a fluid control valve, a solenoid winding for operating said valve, a current amplifier, three input circuits and one output circuit associated with the amplifier, control means having a reversible polarity signal and connected in one input circuit for controlling the signal from the output circuit, said solenoid winding being connected in the output circuit, control means energized in proportion to the magnitude of the signal in the output circuit for energizing a second of said input circuits, and control means for energizing the third input circuit for reducing the signal in the output circuit to a minimum when the magnitude of the signal in the output circuit is less than a predetermined value to permit closure of said valve.

3. A modulating valve control system including, in combination, a fluid control valve, a solenoid winding for operating said valve, a saturable magnetic core, a load winding on said core connected to an output circuit including said solenoid winding, an alternating current supply connected to the load winding, a rectifier connected across the load winding having a load resistor across which a voltage proportional to the current in the load winding is developed, a thermostat bridge having an output signal, a thermostat control winding on said core energized by said output signal in proportion to the temperature difference between ambient temperature and the control setting of the thermostat bridge, said output signal having one polarity when the ambient temperature is higher than the setting of the thermostat bridge and an opposite polarity when the ambient temperature is lower than the temperature setting of the thermostat bridge, a bias control winding on the core energized in proportion to the voltage across said load resistor, and a cutoff control winding on said core connected between a fixed reference voltage and the voltage across said load resistor, said cutoff control winding being energized when the fixed reference voltage exceeds the voltage developed across the load resistor for desaturating the core and reducing the current in the output circuit to a minimum and permit closure of said valve.

4. A control system including, in combination, a magnetic amplifier having a load winding and three control windings, a fluid control valve, a solenoid winding for operating said valve and energized in response to the current through said load winding, means having a reversible polarity signal for energizing one of said control windings to vary the magnitude of the current in said load winding, means for energizing a second of said control windings in proportion to the magnitude of the current in said load winding, and means for energizing the third control winding when the magnitude of the current in the load winding is less than a predetermined value for reducing the current in the load winding to a minimum and permit closure of said valve.

5. A control system including, in combination, a magnetic amplifier having a load winding and three control windings, a fluid control valve, a solenoid winding for operating said valve and energized in response to current through said load winding, a thermostat bridge having an output signal proportional to temperature, said output signal having one polarity when the controlled temperature is higher than the setting of the thermostat bridge and an opposite polarity when the controlled temperture is lower than the setting of the thermostat bridge, means connecting one of said control windings with said thermostat bridge for controlling the current in said load winding in response to temperature, means for energizing a second of said control windings in proportion to the magnitude of the current in the load winding, and means for energizing the third control winding when the magnitude of the current in the load winding is less than a predetermined value for reducing the current in the load winding to a minimum and permit closure of said valve.

6. A modulating valve control system including, in combination, a magnetic amplifier having a load winding and three control windings, a fluid control valve, a solenoid winding for operating said valve and energized in response to current through said load winding, a rectifier connected across said load winding having a load resistor across which a voltage proportional to the current in the load winding is developed, a thermostat bridge having an output signal varying with temperature, said output signal having one polarity when the controlled temperature is higher than the setting of the thermostat bridge and an opposite polarity when the controlled temperature is lower than the setting of the thermostat bridge, means connecting one of said control windings with the output of said thermostat bridge for controlling the current in said load windings in accordance with temperature, means connecting a second of said control windings across said load resistor for energizing said second control winding in proportion to the current in the load winding, and means energizing the third control winding when the magnitude of the current in the load winding is less than a predetermined value for reducing the current in the load winding to a minimum and permit closure of said valve.

7. A modulating valve control system, including in combination, a magnetic amplifier having a load winding, a thermostat control winding, a bias control winding and a cutoff control winding, a fluid control valve, a solenoid winding for operating said valve and energized in response to current through said load winding, an alternating current supply connected to the load winding, a rectifier connected across the load winding having a load resistor across which a voltage proportional to the current in the load winding is developed, a thermostat bridge, a source of constant D.C. voltage for energizing said bridge, said thermostat bridge having an output signal varying with temperature, said output signal having one polarity when the controlled temperature is higher than the setting of the thermostat bridge and an opposite polarity when the controlled temperature is lower than the setting of the thermostat bridge, means connecting the thermostat control winding with the output signal of the thermostat bridge for controlling the current in the load winding in response to temperature, means connecting the bias control winding across said load resistor for energizing said bias control winding in proportion to the current in the load winding, and means energizing said cutoff control winding when the current in the load winding is less than a predetermined magnitude for reducing the current in the load winding to a minimum and permit closure of said valve.

8. A modulating valve control system including, in combination, a magnetic amplifier having a load winding, a thermostat control winding, a bias control winding, and a cutoff control winding, a fluid control valve, a solenoid winding for operating said valve and energized in response to current through said load winding, an alternating current supply connected to the load winding, a rectifier connected across the load winding having a load resistor across which a voltage proportional to the current in the load winding is developed, a thermostat bridge, a source of constant D.C. voltage for energizing said thermostat bridge, said thermostat bridge having an output signal varying with temperature, said output signal having one polarity when the controlled temperature is higher than the setting of the thermostat bridge and an opposite polarity when the controlled temperature is lower than the setting of the thermostat bridge, means connecting the output signal of the thermostat bridge, said thermostat control winding for varying the current in the load winding in accordance with temperature, means connecting said bias control winding across said load resistor for energizing said bias control winding in proportion to current in the load winding, and a circuit including said cutoff control winding connected between said load resistor and a fixed reference voltage for controlling the energization of said cutoff winding, said circuit including unidirectional current conducting means for energizing said cutoff winding when the fixed reference voltage exceeds the voltage across said load resistor to reduce the current in the load winding to a minimum and permit closure of said valve.

9. The control system set forth in claim 8 wherein said unidirectional current conducting means comprises a switching diode.

10. A modulating valve control system including, in combination, a magnetic amplifier having a load winding, a thermostat control winding, a bias control winding and a cutoff control winding, a fluid control valve, a solenoid winding for operating said valve and energized in response to current through said load winding, an alternating current supply connected to the load winding, a first rectifier connected across the load winding having a load resistor across which a voltage proportional to the current in the load winding is developed, a second rectifier connected to said alternating current supply, a voltage divider network connected across the output terminals of said second rectifier including a potentiometer, voltage regulating means connected across said potentiometer for maintaining a substantially constant voltage across said potentiometer irrespective of variations in the voltage of said alternating current supply, a thermostat bridge energized by the constant voltage across said potentiometer and having an output varying with temperature, means connecting the output of the thermostat bridge with said thermostat control winding for controlling the current in said load windings in accordance with temperature, means energizing the bias control winding from said load resistor, and a circuit for energizing said cutoff control winding connected between the adjustable contact of said potentiometer and said load resistor and including unidirectional current conducting means whereby said cutoff winding is only energized when the reference voltage from said potentiometer exceeds the voltage developed across the load resistor to reduce the current in the load winding to a minimum and permit closure of said valve.

11. The control system set forth in claim 10 wherein said bias winding is also energized from a portion of said voltage divider network so that the voltage impressed on the bias control winding varies with variations in the voltage of the alternating current supply to compensate said magnetic amplifier for such variations.

References Cited in the file of this patent

UNITED STATES PATENTS

| | | |
|---|---|---|
| 1,989,829 | Specht | Feb. 5, 1935 |
| 2,056,285 | Machlet | Oct. 6, 1936 |
| 2,519,789 | Perkins | Aug. 22, 1950 |
| 2,730,304 | Markow et al. | Jan. 10, 1956 |
| 2,733,404 | Ogle | Jan. 31, 1956 |
| 2,751,549 | Chase | June 19, 1956 |
| 2,757,332 | Carleton et al. | July 31, 1956 |
| 2,810,526 | Rogers | Oct. 22, 1957 |
| 2,814,773 | Comins et al. | Nov. 26, 1957 |